March 24, 1970  C. GRESHAW  3,502,193
HOPPER FOR ORIENTING AND DELIVERING ARTICLES
Filed April 29, 1968  2 Sheets-Sheet 1
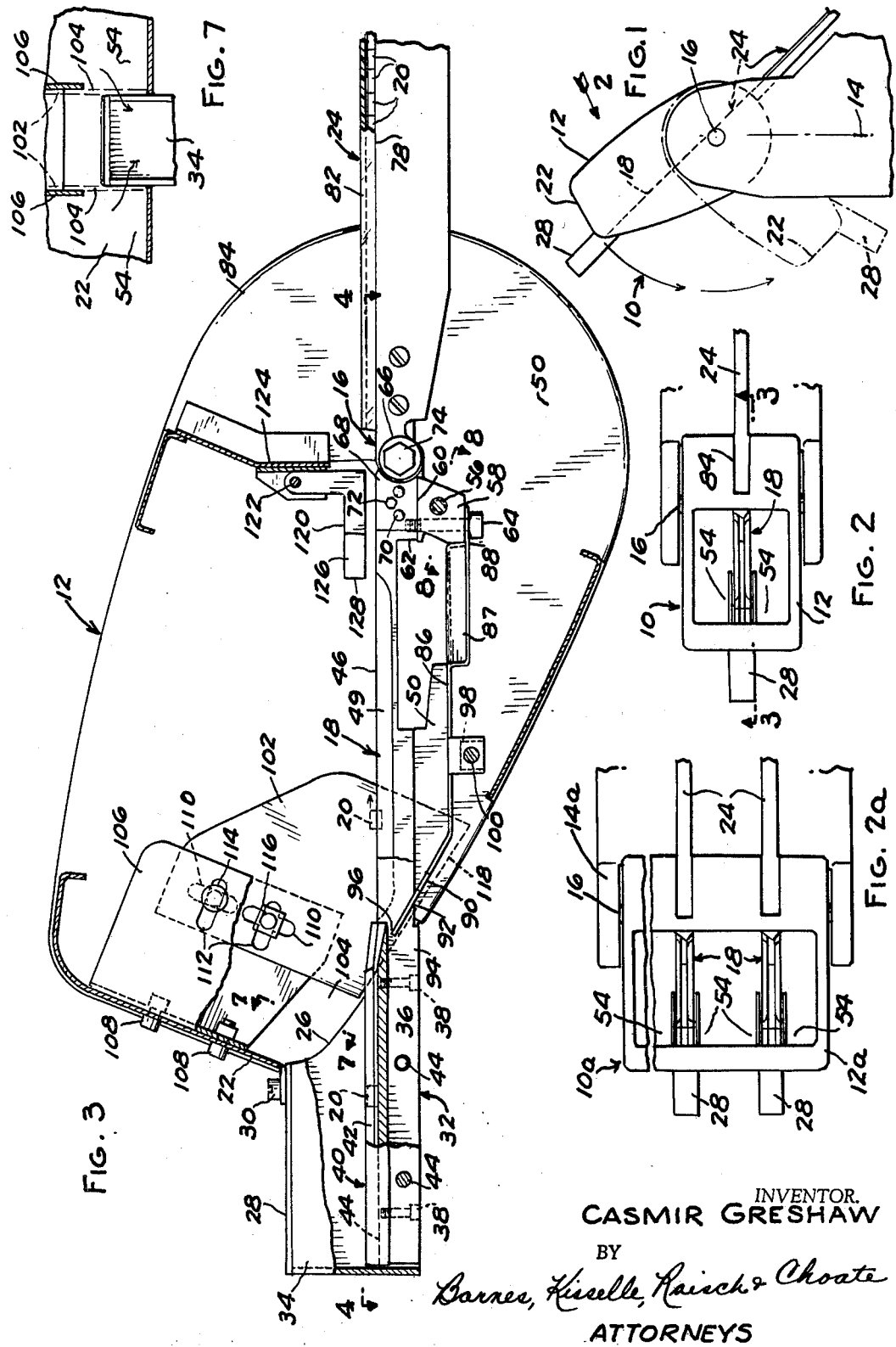
INVENTOR.
CASMIR GRESHAW
BY
Barnes, Kisselle, Raisch & Choate
ATTORNEYS

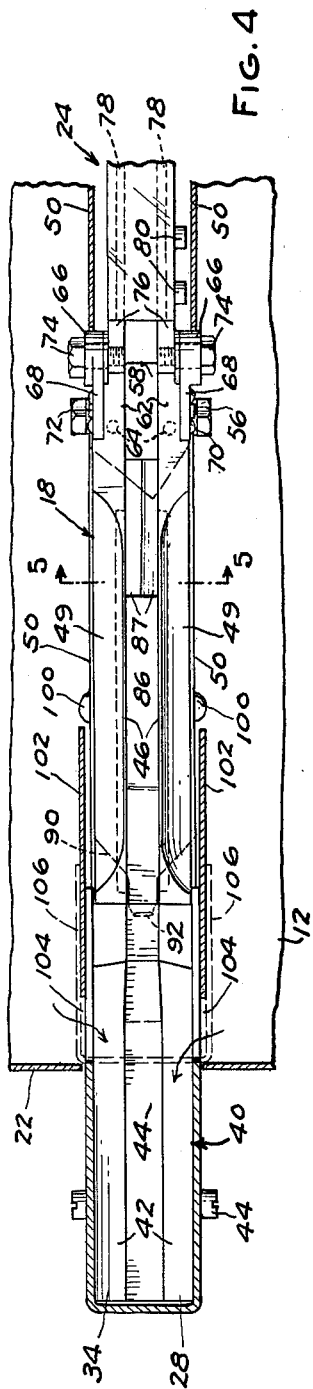
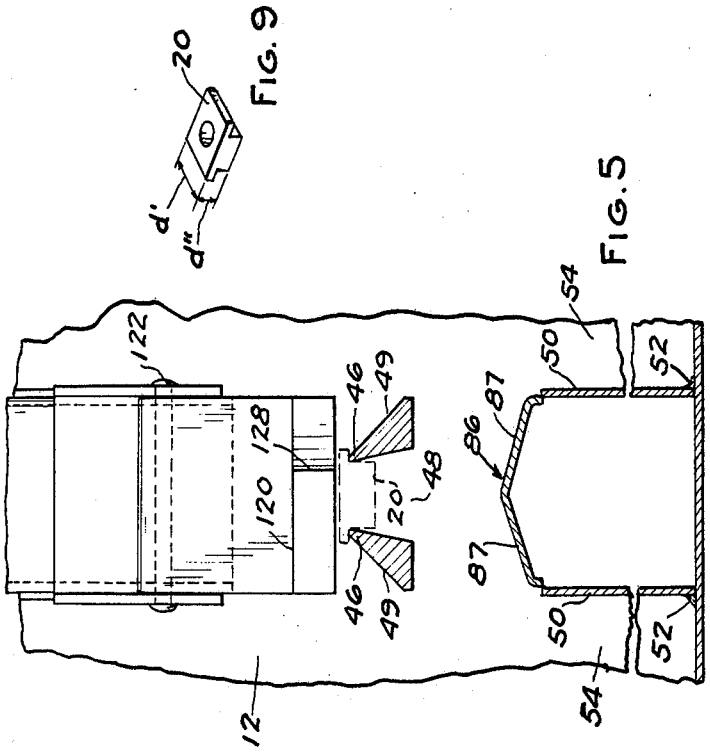
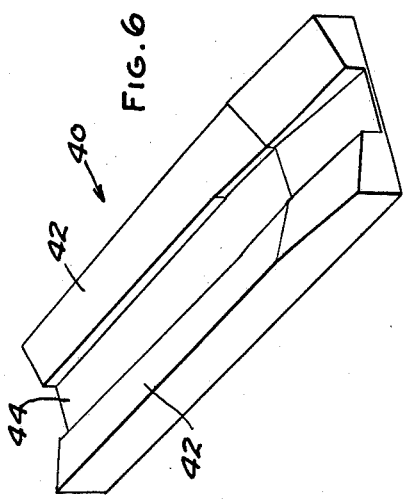
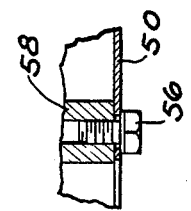

United States Patent Office 3,502,193
Patented Mar. 24, 1970

3,502,193
HOPPER FOR ORIENTING AND
DELIVERING ARTICLES
Casmir Greshaw, Royal Oak, Mich., assignor to The
Clyde Corporation, Troy, Mich., a corporation of
Michigan
Filed Apr. 29, 1968, Ser. No. 725,112
Int. Cl. B65g 47/24
U.S. Cl. 198—33
19 Claims

ABSTRACT OF THE DISCLOSURE

The body of a vertically oscillating hopper has an enclosure in extension thereof which contains an extension of an internal track which receives and delivers properly oriented articles to an external track in upward position thereof. Baffles are provided which limit the number of articles entering the enclosure in downward position of the hopper body.

This invention relates to a hopper of the type having a body adapted to contain a mass of articles in random orientation. The hopper body oscillates between a downward position in which the articles are amassed at an end portion thereof and an upward position in which the articles are cascaded onto an internal track. The track receives and supports those articles which are properly oriented and delivers them gravitationally to another track outside of the hopper body in their proper orientation. An example of such a hopper is disclosed in U.S. Patent No. 3,206,000.

Hoppers of this type are very reliable for delivering markedly asymmetrical articles such as headed bolts, screws and nuts at rates required by modern automatic machinery which applies the articles to workpieces. However, prior to the present invention such hoppers have not been capable of delivering relatively more symmetrical articles fast enough for use with automatic machines. The reason is that such articles must be more precisely oriented in order to be received and held by the track; and statistically fewer of the articles are so oriented when they contact the track upon each oscillation of the hopper body. It is not feasible to increase the oscillation rate to compensate for this factor and it is uneconomical to increase the size of the hopper to that extent.

The object of this invention is to provide a relatively simple, inexpensive, compact oscillating hopper structure improved to deliver relatively symmetrical articles in properly oriented position at rates required by automatic machines or equipment.

Generally, the invention is carried out by providing an enclosure in extension of the hopper body, this enclosure containing an extension of the internal track within the hopper body. Baffles are provided which limit the number of articles entering the enclosure upon each downward stroke of the hopper body. This increases the effective length of the track and insures random individual movement of the articles relative to the track upon the upward stroke. The combined effect is an increased number of properly oriented articles engaging the track during each cycle of hopper oscillation. One form of the invention is shown in the accompanying drawings:

FIG. 1 is a diagrammatic side elevation of a hopper structure embodying the present invention.

FIG. 2 is an elevational view in the direction of arrow 2 of FIG. 1.

FIG. 2a is a view similar to FIG. 2 but showing a modified form of hopper.

FIG. 3 is an enlarged sectional view on line 3—3 of FIG. 2.

FIG. 4 is a sectional view on line 4—4 of FIG. 3.

FIG. 5 is an enlarged sectional view on line 5—5 of FIG. 4.

FIG. 6 is a perspective view of a track extension element.

FIG. 7 is a fragmentary sectional view on line 7—7 of FIG. 3.

FIG. 8 is a fragmentary sectional view on line 8—8 of FIG. 3.

FIG. 9 is a perspective view of an article which the hopper is adapted to orient and feed.

Shown in FIG. 1 is a hopper 10 according to this invention. The hopper has a body 12 mounted on a stand 14 through a pivot 16 about which it oscillates vertically between the upward solid line position and the downward broken line position. Suitable conventional drive mechanism (not shown) is provided for oscillating the hopper. A track 18 is mounted within and oscillates vertically with body 12. The hopper body is adapted to receive a mass of articles such as clinch nuts 20 (FIG. 9) in random orientation.

When the hopper body is in the downward position of FIG. 1 these articles amass in an end portion 22 thereof and in the upward position the articles cascade upon internal track 18. Those articles which contact the track in proper orientation are received and held by the track. Such articles slide gravitationally downwardly and onto an external stationary track 24 for delivery to mechanism (not shown) which utilizes or further transfers the articles. This much of the structure is conventional.

In accordance with the invention end portion 22 of the hopper body is provided with an opening 26 at a location distal of pivot 16. A shell 28 is secured over opening 26 as by bolting 30. In the form of the invention illustrated shell 28 has an open bottom which is closed by a track 32 forming an extension of internal track 18. Track 32 and shell 28 cooperate to define an enclosure 34 in extension of hopper body 12. In the illustrated form track 32 includes integral extension 36 of track 18 bolted at 38 to a member 40 defining upwardly disposed rails 42 and an intermediate closed bottom portion 44 spaced below the rail surfaces. Track extensions 36 are secured to shell 28 by screws 44.

Internal track 18 has two laterally spaced rails 46 and the spacing between these rails is open to the bottom of hopper body 12 as shown at 48 in FIG. 5. Rails 42 and 46 are in mutual extension of each other. Rails 46 have sloped outer sides 49 for a purpose to be described.

A pair of partition plates 50 are secured to the interior of hopper body 12 as by welding 52. These partition plates divide the interior of the hopper body into two chambers 54. The partition plates are bolted at 56 to an interposed block 58 provided with spaced apart shoulders 60 against which the forward end portions 62 of rails 46 are anchored by bolts 64. Pivot 16 comprises a pair of bearings 66 each of which has a lug 68 riveted at 70 to an end portion 62 of a rail 46. Rail ends 62 together with their bearing lugs 68 are securely anchored against block 58 by a bolt 72.

Pivot 16 is completed by shouldered bolts 74 passing through bearings 66 and threaded into end portions 76 of a pair of rails 78 which define external track 24. Rails 78 and an interposed spacer are anchored together by bolting 80. The external track is provided with a cover 82 to contain articles 20 disposed thereon. Hopper body 12 has a slot 84 which clears external track 24 to facilitate vertical oscillation of the hopper body.

The space between the portions of partition plates 50 beneath track 18 is closed by a plate 86. A forward portion of the plate is sloped as at 87 for a purpose to be described. The forward end portion 88 of plate 86 is anchored to block 58 by bolts 64. The rearward end of the plate is tapered inwardly at 90 to define a tongue 92 which fits into a bottom slot 94 between internal rail extensions 36 for relatively positioning plate 86 and the rails. Tongue 92 also closes that portion of opening 26 below track extension 32 except for a small opening 96 through which dirt or other foreign matter may fall out of the hopper body when the same is at its downward position. Plate 86 has side tabs 98 fastened to partition plates 50 by bolts 100.

Opening 26 in hopper body 12 defines an entrance into enclosure 34. Means are provided for limiting the number of articles 20 which can pass through entrance 26 into enclosure 34 in downward position of the hopper body. In the form of the invention illustrated this means comprises a pair of baffle plates 102 mounted adjacent opposite sides of internal track 18 and its extension 32 thereby providing two lateral openings 104 adjacent entrance 26. It will be noted that one opening 104 is provided for hopper chamber 54.

Baffle plates 102 are mounted so that they can be moved toward and away from end portion 22 of the hopper body to adjust the sizes of openings 104. The adjustable mounts for plates 102 comprise a pair of support plates 106 secured as by bolts 108 to end portion 22 of the hopper body. The support plates are provided with slots 110 which extend generally vertically as FIG. 3 is viewed and the baffle plates are provided with generally horizontal slots 112 aligned with slots 110. Bolts 114 with nuts 116 thereon pass through the aligned pairs of slotted openings. The bottom edge 118 of each baffle plate 102 is shaped complementally to the internal contour of the contiguous portion of hopper body 12.

A gate 120 is pivotally mounted at 122 on a portion 124 of the central partition defined by plates 50. The gate has a tapered end 126 facing upstream of internal track 18 and has an apex 128 aligned with track 18 but disposed off-center with respect to the track for a purpose to be described.

In use it may be assumed that a mass of articles 20 have been introduced into hopper body 12 and that the hopper body is being oscillated vertically between the upward and downward positions of FIG. 1. Upon each downward stroke the articles in the body amass adjacent end portion 22 thereof. A number of these articles pass through the lateral openings 104 and through entrance 26 into enclosure 34. Upon each upward stroke of the hopper body the articles in enclosure 34 are cascaded upon track extension 32 and internal track 18 within the hopper body proper.

Those articles which become deposited on rails 42, 46 in the properly oriented position illustrated in FIGS. 3 and 5 will be supported on the rails and will slide downwardly toward pivot 16. When internal track 18 becomes aligned with external track 124 as shown in FIGS. 1, 3 the properly oriented articles on internal track 18 slide under gate 120 and onto external track 24 from which they pass to other transporting mechanism or work.

Those articles 20 which are not properly oriented when they deposit on rails 42, 46 either fall between rails 46 or fall off of the sloped sides 49 thereof or are plowed to the sides of rails 46 by tapered end 126 of gate 120. The off-center location of apex 128 prevents an article in contact therewith from becoming lodged at a position dead center or internal track 18. The articles which fall between rails 46 are ultimately diverted by sloped portions 87 of plate 86 to one side or the other of partition formed by plates 86 and 50.

It will be noted that the spacing between rails 46 is greater than cross dimensions $d'$ and $d''$ of article 20 to facilitate their return to the hopper bottom through opening 48 when improperly oriented. When the hopper body rocks downwardly internal track 18 rocks away from gate 120 which remains in the generally horizontal position illustrated. This releases any article 20 which may have become wedged or jammed under gate 120 in the previous upward stroke.

The purpose of baffle plates 102 is to cause a nearly optimum number of articles 20 enter enclosure 34 upon each downward movement of hopper body 12. On the one hand this number should be sufficient to insure effective utilization of the entire extent of internal track 18 and extension 32 for receiving and delivering properly oriented articles 20. On the other hand the number must be limited so that those which do enter enclosure 34 remain relatively free to move individually to facilitate adjustment of their orientation with respect to track 18, 32. Moreover the number of articles in enclosure 34 must not be so great that they become solidly packed and slide out of the enclosure as an agglomerated mass upon upward movement of the hopper body. This would defeat the orienting function of track 18, 32.

To obtain proper adjustment of baffle plates 102 bolts 114 are loosened and the plates are moved toward or away from end portion 22 of the hopper body as permitted by slotted openings 110, 112. This adjusts the effective sizes of openings 104. When the desired adjustment has been obtained bolts 114 are tightened to secure baffle plates 102 in adjusted position. The optimum position of baffle plates 102 for any particular type of item with which the hopper is being used is determined empirically.

Enclosure 34 and track extension 32 therein increase the delivery rate of hopper 10 to the extent that it is commercially satisfactory for use in delivering articles which are relatively hard to orient at delivery rates required by automatic machines and equipment. Insofar as the inventor is aware, prior to the present invention no oscillating type hopper has been capable of orienting and delivering such articles at such rates of delivery. It will be obvious that the invention also increases the orienting and delivery rate of the hopper with respect to articles such as headed screws or bolts which are conventionally handled by oscillating hoppers.

The drawings illustrate the actual relative size of an enclosure 34 and track extension 36 with respect to a hopper body 12 in a typical commercially successful hopper. In most cases enclosure 34 need not be wider than track extension 36, and can have both a height and length which is relatively small as compared to that of hopper body 12. In view of the results obtained the additional size, weight and cost of enclosure 34 and track extension 36 is insignificant.

The hopper structure 10a shown in FIG. 2a is similar to that described above except that hopper body 12a and base 14a are extended laterally to accommodate plural tracks 18, 24 and plural track extensions 32 and enclosures 34. The partition plates divide the interior of hopper body 12a into two chambers 54 for each track 18 and as illustrated the chambers between two tracks 18 may adjoin. Functioning of hopper 10a is similar to that of hopper 10 except that its delivery rate is multiplied.

I claim:

1. In a hopper having a body oscillatable between a downward position for amassing articles in a portion thereof and an upward position for cascading the articles from said portion over an internal track which receives and supports those articles deposited thereon in a particular orientation, and an external track aligned for receiving the oriented articles from the internal track in upward position thereof, improved structure which comprises means defining an enclosure in extension of said body portion, said internal track having an extension which is disposed in said enclosure, and metering means in said body effective to limit the number of articles which enter said enclosure from said body portion in downward position thereof.

2. The structure defined in claim 1 wherein said enclosure has a width less than that of said body portion.

3. The structure defined in claim 2 wherein said width is not substantially greater than that of said track extension.

4. The structure defined in claim 3 wherein said enclosure has a height less than that of said body portion.

5. The structure defined in claim 1 wherein said metering means comprises baffle means mounted adjacent the entrance to said enclosure from said body portion.

6. The structure defined in claim 5 wherein said baffle means is movably mounted on the interior of said body to adjust the effective size of said entrance.

7. The structure defined in claim 5 wherein said baffle means comprises a pair of baffle plates mounted adjacent opposite sides of said internal track to define two lateral openings adjacent the enclosure entrance.

8. The structure defined in claim 7 wherein said baffle plates are movably mounted on the interior of said body to adjust the effective size of said openings.

9. The structure defined in claim 8 wherein a pair of supports are provided on said body portion, said supports and baffle plates being interconnected by bolts in slotted openings by which said plates are adjustably positioned relative to said supports.

10. The structure defined in claim 1 wherein said internal track and extension thereof have substantially equally effective widths,
said enclosure having a width not substantially greater than that of said track and extension,
said metering means comprising a pair of baffle plates mounted adjacent opposite sides of the internal track to define two lateral openings adjacent the entrance to said enclosure from said body portion.

11. The structure defined in claim 1 wherein said internal track has rails which are spaced apart to support portions of an article properly oriented thereon,
the spacing between the rails being greater than a cross dimension of an article thereon improperly oriented so that such article falls between said rails,
said track being open between said rails to return such article to the bottom of the hopper.

12. The structure defined in claim 1 wherein said hopper body includes means forming a partition which divides the hopper body into two chambers adjacent opposite sides of said internal track,
said metering means comprising a baffle plate adjacent each side of said partition and spaced from an end portion of said hopper body adjacent the entrance to said enclosure from said hopper body,
the spacing between said baffle plates and said end portion defining two lateral openings adjacent said entrance through which said articles enter said enclosure from said chambers.

13. The structure defined in claim 12 wherein said baffle plates are mounted for movement toward and away from said end portion to adjust the effective sizes of said openings.

14. The structure defined in claim 12 wherein said internal track has rails which are spaced apart to support portions of an article properly oriented,
the spacing between the rails being greater than a cross dimension of an article thereon improperly oriented so that such article falls between said rails,
said track being open between said rails to pass such article toward the bottom of the hopper body,
said partition having a portion which extends beneath said track and which has a top below said track, said partition top being sloped to divert an article falling thereon into one of said chambers.

15. The structure defined in claim 1 wherein said means defining said enclosure comprises an opening in said body portion and a shell secured to said hopper body over said opening and extending away from said body portion.

16. The structure defined in claim 15 wherein said track extension forms a closure which closes a bottom portion of said shell.

17. The structure defined in claim 16 wherein said hopper body has a partition extending under said internal track, said partition having a portion which cooperates with an underside of said track extension to close a portion of said opening in said body.

18. The structure defined in claim 17 wherein said track extension has a recessed underside into which said partition portion projects for relatively positioning said partition portion and track extension.

19. The combination defined in claim 1 wherein there are a plurality of said internal tracks, external tracks and improved structures, said hopper body including partitions which divide said hopper body into two chambers adjacent opposite sides of each internal track, the two chambers between adjacent internal tracks adjoining, each of said metering means being effective to admit articles from two adjacent chambers into said enclosure.

References Cited
UNITED STATES PATENTS 3,084,782   4/1963   Bower.

RICHARD E. AEGERTER, Primary Examiner

R. S. GAITHER, Assistant Examiner

U.S. Cl. X.R.

221—160